US007946483B2

(12) United States Patent
Miller et al.

(10) Patent No.: US 7,946,483 B2
(45) Date of Patent: May 24, 2011

(54) BIOMETRIC CONTROL OF EQUIPMENT

(75) Inventors: Brian Scott Miller, Charleston, WV (US); Jack Vaughan, Charleston, WV (US); Oscar Allen Ladriere, Charleston, WV (US); Gino DiSimone, Reno, NV (US)

(73) Assignee: Deadman Technologies, LLC, Charleston, WV (US)

( * ) Notice: Subject to any disclaimer, the term of this patent is extended or adjusted under 35 U.S.C. 154(b) by 555 days.

(21) Appl. No.: 12/041,194

(22) Filed: Mar. 3, 2008

(65) Prior Publication Data

US 2008/0223926 A1 Sep. 18, 2008

Related U.S. Application Data

(60) Provisional application No. 60/892,313, filed on Mar. 1, 2007.

(51) Int. Cl.
*G06K 5/00* (2006.01)

(52) U.S. Cl. .......................................................... 235/382

(58) Field of Classification Search ................. 235/379, 235/380, 382
See application file for complete search history.

(56) References Cited

U.S. PATENT DOCUMENTS

| | | | | |
|---|---|---|---|---|
| 4,319,333 | A | 3/1982 | Hedrick | |
| 4,731,730 | A | 3/1988 | Hedrick et al. | |
| 5,415,551 | A | 5/1995 | Semenza | |
| 5,711,456 | A | 1/1998 | Bryant | |
| 5,719,950 | A | 2/1998 | Osten et al. | |
| 5,957,148 | A | 9/1999 | Sell | |
| 6,186,196 | B1 | 2/2001 | Leigh et al. | |
| 6,229,908 | B1 | 5/2001 | Edmonds, III et al. | |
| 6,324,650 | B1 | 11/2001 | Ogilvie | |
| 6,327,376 | B1 | 12/2001 | Harkin et al. | |
| 6,609,534 | B1 | 8/2003 | Beaney et al. | |
| 6,788,928 | B2 | 9/2004 | Kohinata et al. | |
| 6,799,726 | B2 | 10/2004 | Stockhammer et al. | |
| 6,810,310 | B1 | 10/2004 | McBain | |
| 6,836,556 | B1 | 12/2004 | Bromba et al. | |
| 7,172,115 | B2 * | 2/2007 | Lauden | 235/380 |
| 2001/0026546 | A1 | 10/2001 | Schieder et al. | |
| 2003/0032407 | A1 | 2/2003 | Mages | |
| 2003/0174049 | A1 | 9/2003 | Beigel et al. | |
| 2004/0059923 | A1 | 3/2004 | ShamRao | |
| 2004/0148039 | A1 | 7/2004 | Farchmin et al. | |
| 2004/0156327 | A1 | 8/2004 | Yankielun et al. | |
| 2004/0264743 | A1 | 12/2004 | Arnouse | |
| 2006/0104483 | A1 * | 5/2006 | Harel et al. | 382/115 |
| 2006/0213982 | A1 | 9/2006 | Cannon et al. | |
| 2007/0055888 | A1 | 3/2007 | Miller et al. | |

FOREIGN PATENT DOCUMENTS

| | | | |
|---|---|---|---|
| EP | 1494164 | | 1/2005 |
| JP | 2001128253 | A * | 5/2001 |
| WO | WO-2006063392 | | 6/2006 |
| WO | WO-2007019605 | | 2/2007 |

* cited by examiner

*Primary Examiner* — Seung H Lee
(74) *Attorney, Agent, or Firm* — Gifford, Krass, Sprinkle, Anderson & Citkowski, P.C.; Douglas L. Wathen

(57) ABSTRACT

An example apparatus for allowing operation of equipment by an authorized operator comprises a biometric scanner receiving a biometric input from an authorized operator, and transmitting an authorization signal. The apparatus may further includes a base station that allows the equipment to operate while the base station receives the authorization signal from the biometric scanner, and which prevents the equipment from operating shoortly after the authorization signal is no longer received from the biometric scanner.

26 Claims, 9 Drawing Sheets

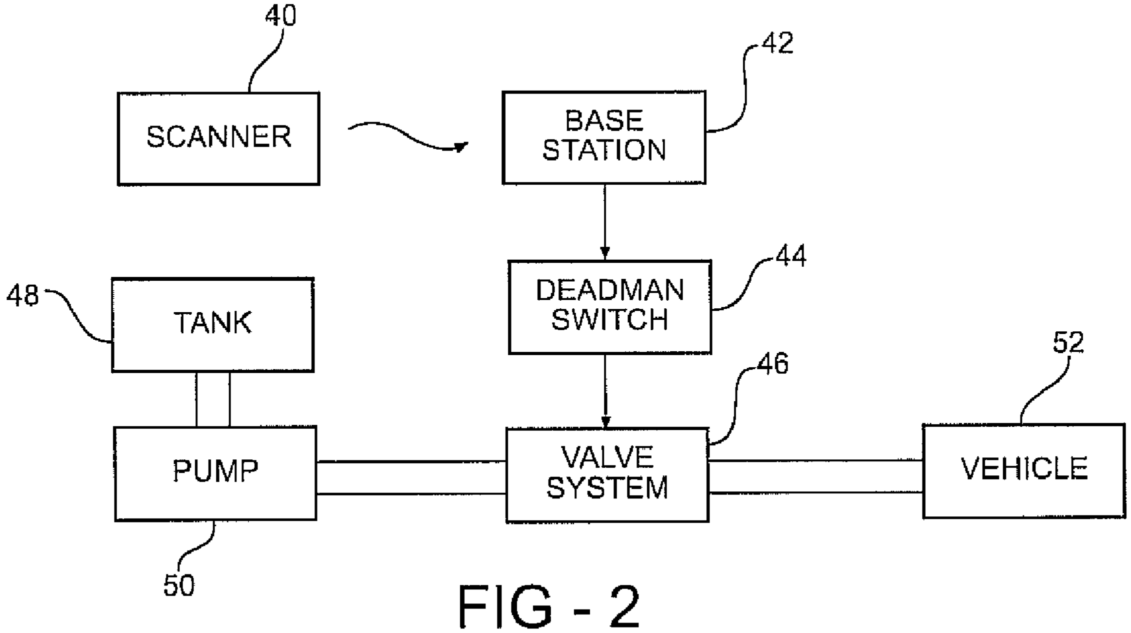
FIG - 2
FIG - 3A
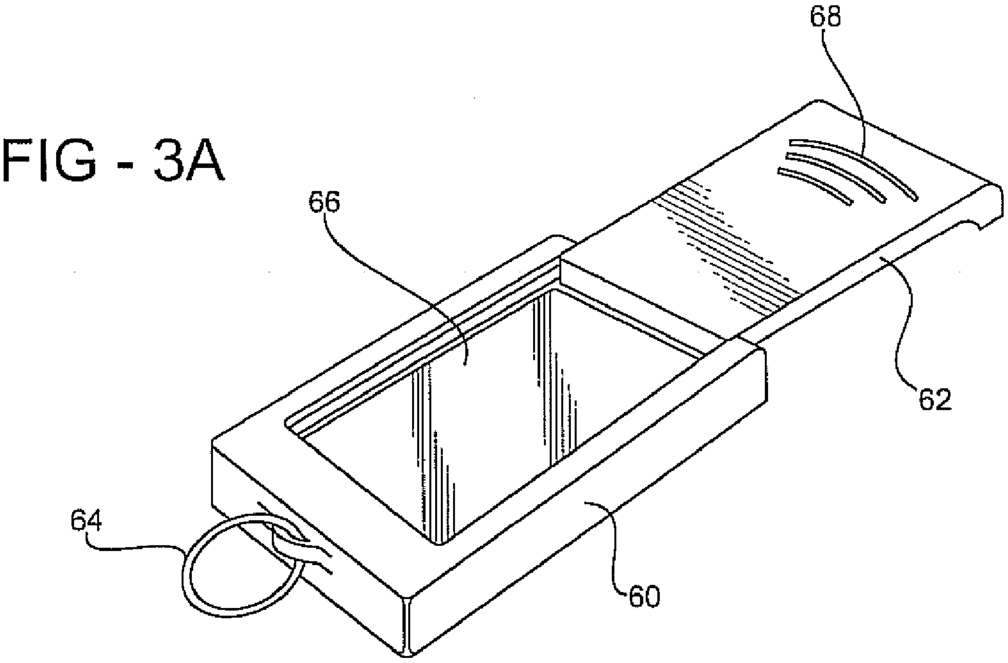

BIOMETRIC CONTROL OF EQUIPMENT

REFERENCE TO RELATED APPLICATION

This application claims priority from U.S. Provisional Patent Application Ser. No. 60/892,313, filed Mar. 1, 2007, the entire content of which is incorporated herein by reference.

FIELD OF THE INVENTION

The invention relates to methods and apparatus for preventing operation of equipment by unauthorized persons.

BACKGROUND OF THE INVENTION

Under typical aviation regulations, a deadman switch should be used when performing any pressure fueling or tender filling operation. Deadman switches are designed to safeguard against circumstances or situations that may delay the suspension of fuel flow. Preferably, a deadman switch should not be jammed or bypassed during any fuel transfer operation. Deadman switch types include the electric deadman switch, pneumatic deadman switch (sometimes called an air deadman switch), and combination air/pneumatic types. The deadman switch is actuated, for example through being in the hands of the operator, during a refueling process.

However, a conventional equipment control system, such as a conventional deadman switch, provides no method of identifying the operator and so may be used by any person, even those not authorized or trained to use the equipment. Also, conventional equipment controls are often susceptible to jamming or locking in an operating position.

There are also many other circumstances where an authorized person such as an authorized operator needs to be in proximity to the equipment or operation. These circumstances may include any hazardous operation (such as a fueling operation), operation of equipment, medical monitoring situations, operation of equipment requiring some kind of safety interlock system, and the like. Conventional equipment control methods generally do not attempt to identify an authorized operator.

SUMMARY OF THE INVENTION

An example apparatus for allowing operation of equipment by an authorized operator comprises a biometric scanner receiving a biometric input from an authorized operator, and transmitting an authorization signal as long as the biometric input is received from the authorized operator. The apparatus further includes a base station that allows the equipment to operate when the base station receives the authorization signal from the biometric scanner, (in some cases substantially only while the authorization signal is received), and that stops the equipment from operating after the authorization signal is no longer received from the biometric scanner, in some cases a predetermined time interval after the authorization signal is no longer received. A biometric scanner may be a portable device having one or more biometric sensors, such as a fingerprint reader, retinal sensor, and the like. In some examples, the biometric scanner is a portable device that transmits an authorization signal to a base station. However, in other examples, a portable device need not include a biometric sensor, and the authorization signal may or may not include a biometric signature or indication that an authorized biometric signature has been received.

A timing delay between the end of the authorization signal and the prevention of equipment operation can be introduced according to the application. In fueling applications, the base station may prevent the fueling equipment from operating within ten seconds or less, such as within five seconds, of the authorization signal being no longer received from the biometric scanner or other authorization device. In other applications, the timing delay may be longer, allowing an operator to provide biometric input at intervals. The intervals may correspond to typical required intervals between deadman switch operations, if appropriate.

The authorization signal may be a wireless signal, allowing the biometric scanner to be a portable device transmitting a wireless signal to the base station. The biometric scanner may include a fingerprint reader or other biometric sensor. The biometric scanner further may further include a memory, the biometric scanner identifying the biometric input as being from the authorized operator by comparing the biometric input with stored biometric data in the memory.

Examples of the present invention can be used with, or replace, deadman switch based systems. For example, a signal can be provided to actuate a deadman switch as long as a biometric input is provided to the biometric scanner. Examples of the present invention include fueling systems, such as airport fueling systems where actuation of a deadman switch is required to operate the fueling system.

A process for allowing operation of equipment by an authorized operator comprises receiving a biometric input from an operator, determining if the biometric input is from the authorized operator, transmitting an authorization signal while the biometric input is provided by the authorized operator, operating the equipment while the authorization signal is received by a base station, and disabling the equipment shortly after the authorization signal is no longer received by the base station. The process may be a fueling process at an airport, and disabling the equipment can occurs within ten seconds or less, such as within five seconds, of the authorization signal being no longer received by the base station.

An example apparatus comprises a biometric scanner, a portable device (which may be a biometric scanner), and a base station. The scanner is in the manager's office and scans authorized fingerprints. (The security of these fingerprints may be the responsibility of the manager and company.) A manager, or other person, may load the authorized fingerprints into the portable device(s) and/or the base station(s). A portable device can communicate with or include the function of a biometric sensor if added security is required.

In a high security mode, a biometric signature from the portable device may be required to match biometric signatures in (or accessible by) the base station. Alternatively, a biometric input may be compared with data on the portable device to determine if the person is an authorized operator. In a lower security mode, a biometric signature may not be required. However biometric "liveness" may be required, for example using an authorization signal including a liveness indication. Biometric liveness is detection of a live human body through a biometric sensor or other means, without (for example) a fingerprint signature or other individual biometric signature being needed. A biometric liveness indication may be provided by pulse detection, or other methods. Further, creation of a data link between the portable device and the base station may require proximity, and optionally an authorization code, such as a device code and/or personal identification number.

In one example, activation of a data link between a portable device and base station requires proximity (between the portable device and the base station), and optionally a device code. Activation by proximity occurs when the portable device is approximately within a certain distance of the base station. For example, the distance may be chosen as approximately within 1 meter in the case of fueling operations. If activation is attempted beyond proximity limits the base station does not activate a data link. Activation by proximity may require an authorization code, such as a device code, from the portable device, in which case the base station does not activate a data link without the device code. In a high security mode, activation may also require biometric signature matching from the user. In a lower security mode, activation may also require biometric liveness, but not a biometric signature. In some examples, the data link corresponds to the portable device transmitting a higher power authorization signal.

Once the data link is activated, the portable device can move away from the base station up to a maximum distance, for example 100 meters or more. The distance may be the maximum achievable by transmission under FCC part 15 regulations, or other transmission range of the portable device. The maximum distance may be adjustable, for example by adjusting transmission power. The portable device can have power transmission trimming to limit the distance and conserve battery life. Continued equipment operation may require substantially constant transmission of device code and biometric liveness (low security) or biometric signature matching (high security).

The portable device may have optional extra features, which may be provided by other devices in communication with it, such as a display. A display, as part of the portable device or separate device, can be used to identify battery life, authorization status, operational parameters (such as fuel delivered in the case of fueling operations), signal strength and other data link parameters, or other data. If the user removes a finger from the biometric sensor (in the case of a fingerprint sensor), the data link may remain active for a predetermined time before the equipment operation is ceased. This time may allow momentary removal of a finger from a fingerprint sensor. For example, a count down timer may be activated. The predetermined time can be user defined, for example, 1 second, 5 seconds, 10 seconds, 1 minute, 5 minutes, or other time as appropriate to the equipment in use. In the case of fueling operations, the base station may disengage a switch to open a valve, so as to stop fueling, if the authorization signal is not received within a predetermined time after reception stops. If the user re-engages the finger and biometric liveness (low security) or biometric signature matching (high security) is resumed before the predetermined time elapses, the base station re-engages the switch or otherwise allows the equipment use to continue.

An example apparatus for facilitating operation of equipment by an authorized operator comprises a portable device operable to transmit an authorization signal, in some cases after (or during) receipt of a biometric signature or other authorization input. The portable device can be operable to transmit the authorization signal at a lower power until the authorization signal is received by the base station, and a response (such as a handshake or other acceptance signal indication of receipt) is received from the base station by the portable device. After receipt of the authorization signal by the base station, the portable device then transmits the authorization signal at a higher power. The higher transmission power may be at least approximately 50% greater than the lower transmission power, in some cases the higher power may be at least double the lower power. A base station is operable to receive the authorization signal, and allows operation of the equipment only if the portable device is initially proximate to the base station (when the authorization signal is first received). The base station may allow continued operation of the equipment as long as the authorization signal is received. As the authorization signal is then transmitted at a higher power, the proximity requirement may be relaxed so that the base station allows operation of the equipment as long as the authorization signal is received. In some examples, the authorization signal may initially require a biometric signature to be received by the portable device. Continued operation of the equipment may require a liveness indication, to prevent an operator leaving the portable device behind, and leaving the area of the equipment.

The base station may allow operation of the equipment only if the portable device is within approximately 2 meters of the base station when the authorization signal is first received, while allowing continued operation of the equipment until the portable device is outside a transmission range of the higher power authorization signal. In some examples, the transmission range may be at least approximately 10 meters, in particular at least 50 meters, and in some examples at least 100 meters.

The authorization signal may be a wireless signal, such as an electromagnetic wireless signal. The authorization signal may include a biometric signature and/or a liveness indication. The liveness indication may be required to be maintained, otherwise the equipment operation may be halted. In some examples, the apparatus may have a plurality of operational modes, such as a first (higher security) operational mode in which the authorization signal includes a biometric signature, and a second (lower security) operational mode in which the authorization signal does not require the biometric signature. The controlled equipment may be a fueling system, actuation of a switch within the base station allowing operation of the fueling system, the switch actuation ending within a predetermined time of the base station no longer receiving the authorization signal, such as 5 seconds, 10 seconds, or some other time.

A user can program the base station with one or more operational parameters, such as total amount of fuel in the case of aircraft fueling. This may occur after creation of a data link. A data link between the portable device and base station may support transmission of various data including but not limited to: amount of fuel (in the case of aircraft fueling), duration of equipment operation, signal strength, identification of the person associated with the operation (such as a fueling session) and the like.

An example apparatus for providing an authorization signal, so as to allow operation of equipment having an associated base station, includes a biometric sensor, a transmitter, a receiver; and an electronic circuit, the portable device being operable to transmit an authorization signal from the transmitter, the authorization signal being transmitted on receiving a biometric signature using the biometric sensor, the portable device being operable to receive an acceptance signal from the base station on acceptance of the authorization signal by the base station, the portable device then being further operable to transmit a higher power authorization signal after receiving the acceptance signal.

A process for allowing operation of equipment by an authorized operator includes receiving an authorization signal from a portable device, allowing operation of the equipment only if the authorization signal has an initial signal strength less than a predetermined threshold, increasing the strength of the authorization signal, and stopping operation of the equipment after reception of the authorization signal is ended. For example, the authorization signal may initially be attenuated, for example by a factor of 0.5 or less, and the attenuation removed after the authorization signal is detected.

A higher-power data link may then be created between an authorization device transmitting the authorization signal, and a base station receiving the authorization signal and operable to allow the equipment to operate as long as an appropriate authorization signal is received.

BRIEF DESCRIPTION OF THE DRAWINGS

FIG. 2 is a schematic of an apparatus according to the present invention used in a fueling system.

FIGS. 3A and 3B show biometric scanners which can be used in examples of the present invention;

DETAILED DESCRIPTION OF THE INVENTION

Figure 1:
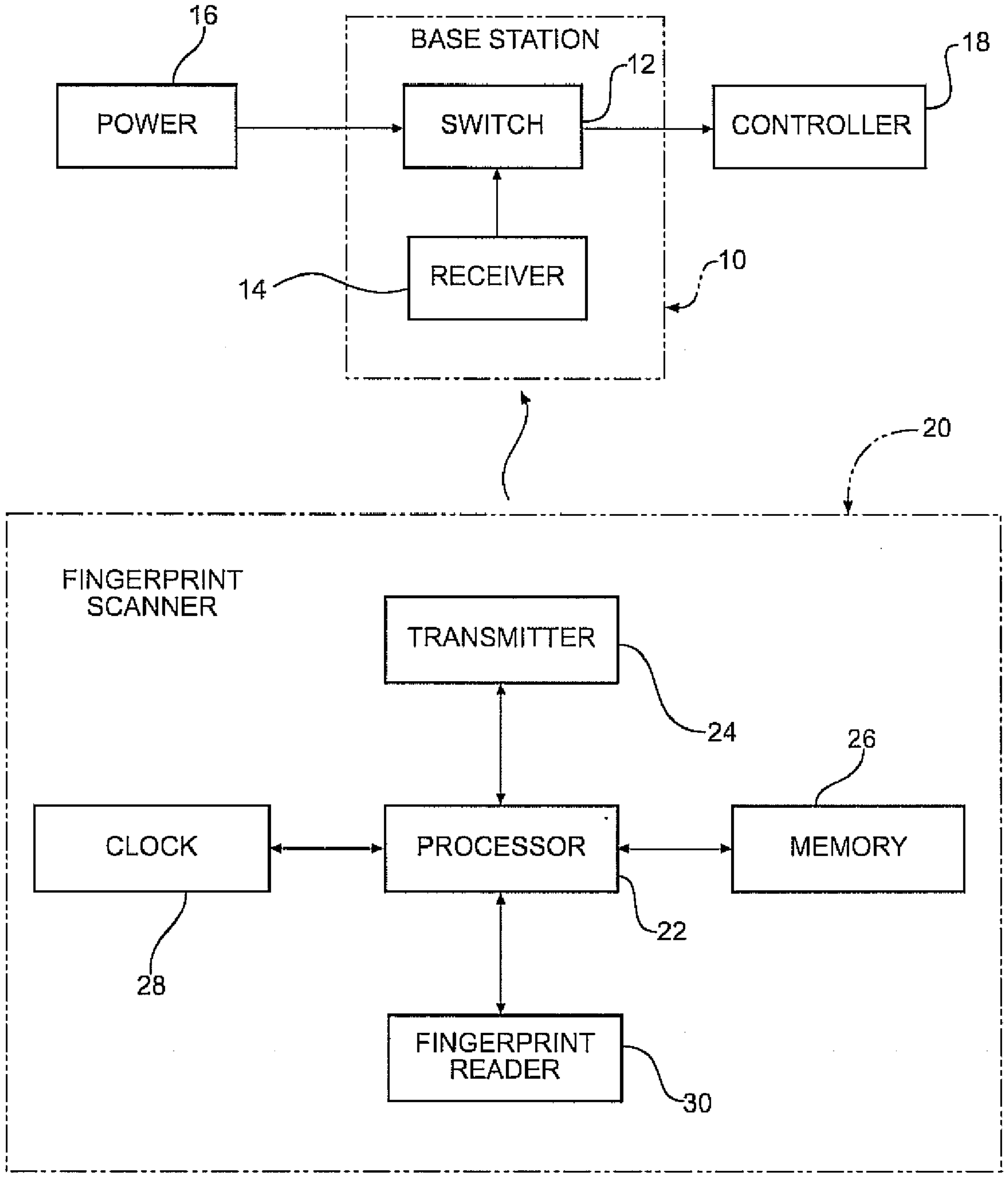
FIG. 1 is a schematic of a base station providing a signal to an equipment controller, the base station receiving a signal from a biometric scanner.

An apparatus for equipment control allows operation of the equipment only if an authorized operator provides a biometric input to the control system. The control system can include a portable biometric scanner in the possession of the operator. Examples of the present invention include an apparatus that provides identification of authorized persons from a biometric input, and which prevents use of equipment if the operator is not identified as an authorized operator.

An example apparatus comprises a portable device transmitting an authorization signal, and a base station allowing the equipment to operate if the base station receives the authorization signal from the portable device. The portable device may include a biometric scanner, or be in communication with a biometric scanner. The base station may prevent the equipment from operating if the authorization signal is not detected, not accepted, or is no longer received from the portable device.

Example apparatus may allow different security modes, for example including a higher security mode in which a biometric signature is required, and/or a lower security mode in which only a liveness indication is required. In other cases, no biometric signature or liveness indication is required. A biometric signature can identify a person as being an authorized individual using a biometric input such as a fingerprint. A liveness indication can show that a living person is in possession of the portable device. For example, a detectable pulse may be required. A higher security mode may require both a biometric signature and a liveness indication.

Example apparatus may farther require proximity of a person to the base station. For example, in an example approach, initiation of equipment operation may require proximity within a first predetermined distance, such as approximately 10 meters, or in some cases within 1 meter. The predetermined distance may be controlled by controlling transmission power of the portable device. For example, after proximity within the first predetermined distance is detected, a data link may be established between the portable device and the base station, and this may then enable a person to move a greater distance from the base station.

A biometric scanner can be used to allow operation of the controlled equipment. The biometric scanner may include a fingerprint reader and/or other biometric sensor. In an example approach, an operator places a finger on the fingerprint reader, and the fingerprint reader reads the fingerprint of the operator and compares this input fingerprint with fingerprints of authorized operators. Alternatively, a base station or other device in communication with the biometric scanner may determine if the biometric input is from an authorized person. Authorized fingerprints can be stored in a memory of the biometric scanner, the base station, or elsewhere, Fingerprints can be deleted from the memory if, for example, the corresponding person is no longer an authorized operator. For example, fingerprints of those that have left the job, or have otherwise lost authorization, can be deleted. Hence, if an equipment operator is fired or leaves the job without notice, unauthorized use by the person can prevented, hence possibly preventing damage to the equipment.

Hence, an improved method for preventing the unauthorized use of equipment by an unauthorized operator includes providing a biometric scanner to an authorized operator, detecting whether the authorized operator is in possession of the scanner by receiving a biometric input from the operator, and only allowing the performance of an operation if the biometric scanner is in possession of the authorized operator.

In the field of airplane refueling, after placing the nozzle of a fuel pump into the adaptor of an aircraft, regulations require that an operator actuate a handheld deadman switch in order to start pumping fuel into the aircraft. In this example, the controlled equipment is an aircraft fueling system. Hazards, such as over-fueling or under-fueling due to operation of equipment by an unauthorized person, can be avoided by only allowing the fueling system to operate if the operator provides a recognized biometric input.

An example apparatus may include a portable (e.g. handheld) biometric scanner which transmits an authorization signal to a base station only as long as an authorized operator provides a recognized biometric input to the biometric scanner. The base station allows operation of the controlled equipment, for example by causing actuation of a deadman switch, only as long as the authorization signal is received from the scanner. Hence, operation of the controlled equipment may no longer be possible if any of the following occur: the scanner is handed to an unauthorized person; the scanner is no longer able to transmit the authorization signal to the base station (for example, the authorization signal may be a wireless signal, and the scanner might be out of range of wireless transmission to the base station); or the authorized person no longer provides the biometric input (for example, taking a finger off a fingerprint reader).

For example, if the biometric scanner includes a fingerprint reader, the fuel pumping system may only be operable as long as an authorized fueling operator has a finger in contact with the fingerprint reader. This safety feature helps ensure the presence of the operator until the fueling operation is complete. Fingerprint authentication can therefore used in an improved aircraft fueling method.

The biometric scanner in the possession of the operator may have a wireless communication to the fueling system. In other examples, the scanner may be built in to a base station, deadman switch, or other equipment control apparatus. In other examples, the base station and controller may be integrated into a single device, or the equipment may include the function of the base station, for example having a radio receiver requiring an authorization signal before the equipment can operate. The base station may receive authorization signals from one or more biometric scanners, and may have alternative ways of providing an authorization signal, such as keying in an identification code and holding down a switch.

FIG. 1 shows a schematic of an example system. The system includes a base station 10 which comprises a switch circuit 12 and receiver 14. The switch receives electrical power from a power source 16 and when energized provides an electrical signal to equipment controller 18. The system also includes a biometric scanner 20, which comprises a processor 22, transmitter 24, memory 26, clock 28, and a biometric sensor, in this case a fingerprint reader 30.

An operator is in possession of the biometric scanner 20 and places a finger on fingerprint reader 30. The presence of the finger is detected, and the fingerprint is read and compared with stored fingerprint data in memory 26. If a match is made, the person is identified as an authorized operator of the system. The transmitter 24 then transmits an authorization signal to receiver 14 within the base station 10. When the receiver 14 receives the authorization signal, the switch 12 is energized, sending an electrical signal to the equipment controller. Equipment controlled by the controller operates, or can be operated, while the authorization signal is transmitted by the authorization device, such as a biometric scanner.

The switch circuit 12 operates to send an electrical signal to the equipment controller during times when the receiver 14 receives the authorization signal from transmitter 24. If the person removes their finger from the fingerprint reader 30, the authorization signal is terminated, and the switch 12 turns off, disabling any equipment controlled by the controller 18.

In this example, the base station 10 and equipment controller 18 (which may be a deadman switch) form a base station that allows equipment operation so long as an authorization signal is received from the biometric scanner.

There may be a slight time delay between removing a finger from the fingerprint reader and turning off of the switch, so as to allow continuous operation of the equipment even if a finger is briefly removed from the fingerprint reader. The time delay between removing a finger from the reader 30, and turning off of any equipment can be fairly short, for example approximately equal to less than ten seconds, such as approximately 5 seconds. In aircraft refueling application, the time delay can be less than five seconds, such as approximately two seconds or less. The time delay can be provided by a suitable electrical circuit in the scanner, the base station, or the controller, for example using an electronic timer or software implementation.

The biometric scanner 20 is preferably a portable device, such as a portable device configured as a key fob, handheld device, or other portable device. The biometric scanner can be a portable electronic device having additional functionality, such as a cell-phone, PDA (personal digital assistant), vehicle remote keyless entry system (in which case, the biometric scanner may also provide a vehicle security feature by only allowing an authorized operator to open and/or use a vehicle), and the like.

The biometric scanner may be built in to a wearable object, for example having additional functionality, such as a wristband, glove (a fingerprint reader may be on the inside of the glove), eyeglass or safety goggles frame (which may include an iris scanner), hat (which may include a face recognition feature using a cap-mounted camera), footwear (which may include a pressure sensor or toe scanner), or other object. In other examples, the biometric scanner or other device (such as a portable device) used to transmit an authorization signal may be provided by a device having additional functionality, such as a cellphone, portable computing device, and the like.

The biometric scanner may also operate as an identity card, for example having an image of the authorized operator on the housing of the biometric scanner. The authorization signal from the biometric scanner may also be transmitted to other devices, such as restricted access entryways (gates, doors, and the like), allowing the person to pass through. The biometric scanner may also transmit a position signal when the biometric input is provided, allowing the position of the operator to be monitored.

The communications link between the transmitter 24 and the receiver 14 may be a wireless link, such as a radio link, so that the authorization signal is a radio signal. The authorization signal may also be provided by a permanent cable link (such as an electric cable or a fiber optic cable), optical signal (such as a laser), IR, or ultrasound signal. The authorization signal may be modulated. The signal modulation may, for example, convey an authorization code if an authorized operator is identified.

FIG. 2 illustrates another configuration of a base station, comprising biometric scanner 40, base station 42, deadman switch 44, valve system 46, fuel storage tank 48, pump 50, and vehicle 52 receiving fuel.

The biometric scanner 40 provides a wireless signal to the base station 42 when an authorized operator gives a recognized biometric input to the biometric scanner. Actuation of the deadman switch 44 is necessary to open valves within the valve system 46, allowing fuel to be pumped from the fuel storage tank 48 to the vehicle 52. The deadman switch actuates, enabling the valve system to allow fuel to pass from the file storage tank to the vehicle. For example, when the deadman switch receives an electrical signal from the base station, this may cause a valve or passage within the valve system to open. The electrical signal to the deadman valve is only provided when an authorization signal is received by the base station from the biometric scanner. Fuel can then pumped by the pump from the storage tank to the vehicle. The fuel storage tank may be a fuel tanker, and the vehicle may be an airplane.

In this example, equipment control includes actuation of the deadman switch. For example the deadman switch may be located within a fuel pump handle. An electrical deadman switch is actuated on receipt of a suitable electrical signal from the base station. For aircraft fueling, typically a 14 V electrical signal is necessary to actuate the deadman switch.

If the deadman switch is mechanical (such as a pneumatic deadman switch) an electrically powered actuator may be provided, configured to actuate the deadman switch on receiving an electrical signal from the base station. In this example, the base station provides the electrical signal necessary for operation of the fuel pump. The base station may also include an electrically powered actuator, and actuate the deadman switch through a mechanical, rather than electrical, coupling. In other examples, the base station and deadman switch can be integrated into a single equipment controller, which itself may be part of the equipment to be controlled.

Figure 3B:
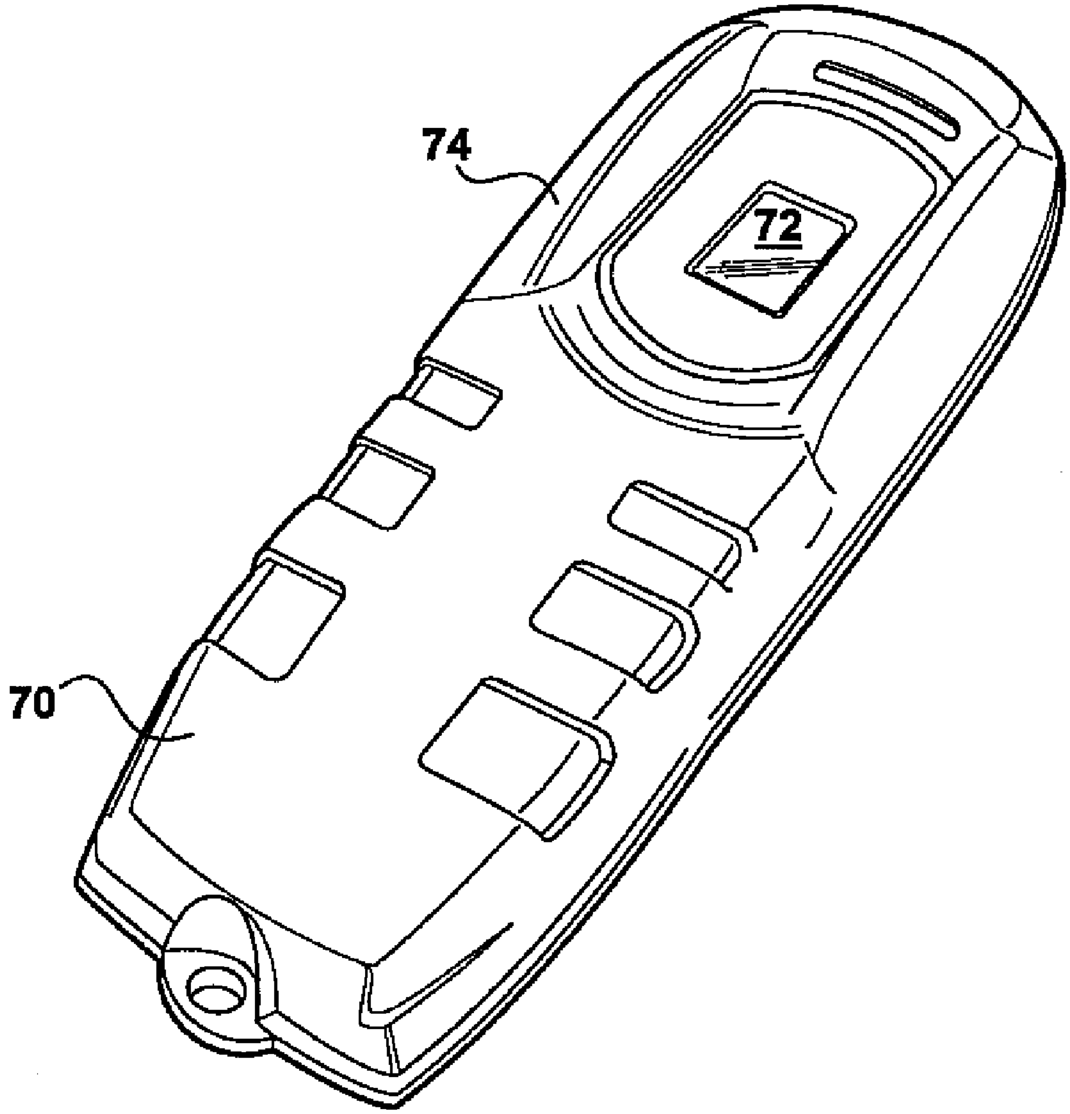

FIG. 3A shows a view of a biometric scanner which can be used in examples of the present invention. The biometric scanner comprises housing 60, slidable cover 62 with an optional gripping surface 68, attachment ring 64, and fingerprint reader 66. An operator slides back the slidable cover and places a finger on the fingerprint reader 66. If the fingerprint is recognized as being that of an authorized operator, the biometric scanner transmits an authorization signal, in this case a wireless signal, to the base station. When not in use, the slidable cover can be pushed back to protect the fingerprint reader. Commercially available fingerprint identification devices are available from various manufacturers, and can be adapted for use with examples of the present invention. FIG. 3B shows another possible form of a portable device 70, including fingerprint reader 72 within a recess 74 in the device housing.

Figure 4:
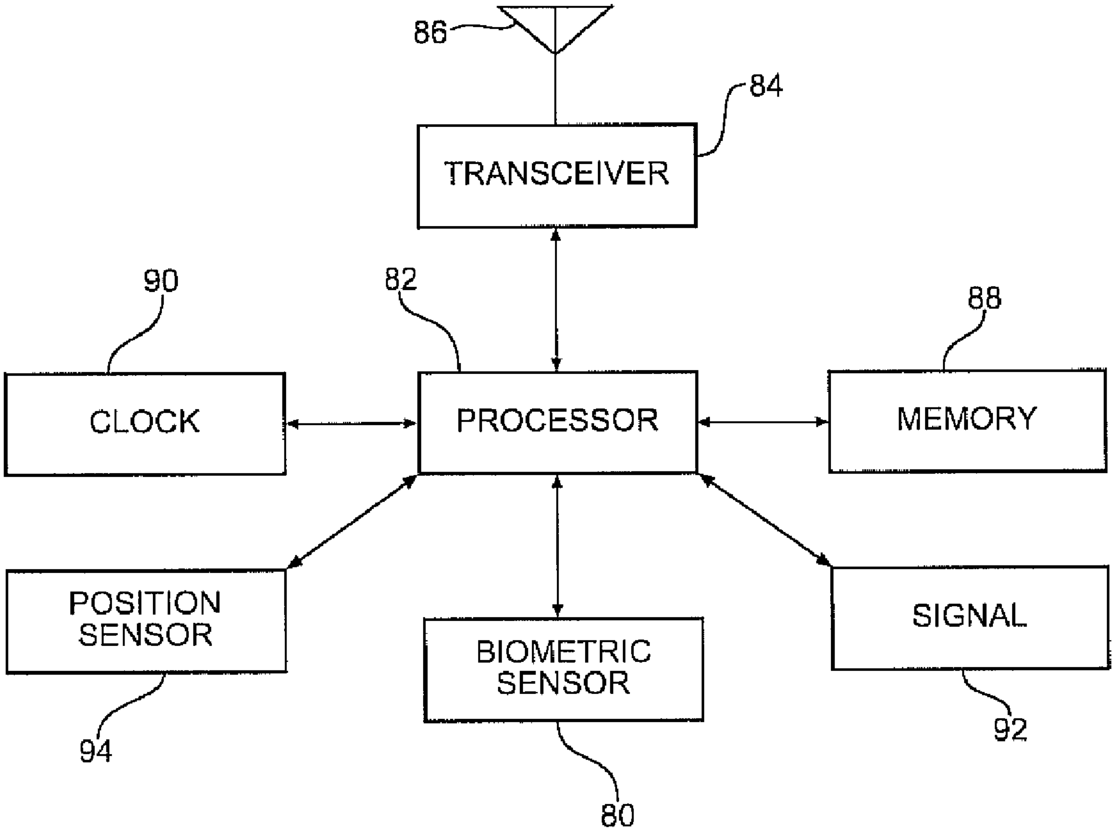
FIG. 4 is a schematic of an example biometric scanner according to the present invention.

FIG. 4 shows a schematic diagram for an example biometric scanner. The scanner comprises biometric sensor 80, processor 82, transceiver 84, antenna 86, memory 88, clock 90, signal 92, and position sensor 94.

The biometric sensor 80 may be a fingerprint reader, iris scanner, or other sensor providing an electrical signal correlated with a unique personal identifier. The biometric scanner may comprise one or more biometric sensors selected from: fingerprint reader (as used here, the term includes palm reader, toe-print reader, or other reader detecting skin topographies such as fingerprints); face recognition (the sensor may be an imaging sensor coupled to a face recognition software system); limb configuration sensor (for example, characterizing relative finger lengths, bone structure, vein structure and/or other configuration of hand, arm, foot, legs, or other anatomical feature); eye scanner (such as a retinal scanner or iris scanner); odor detector (including respiration component sensors); voice recognition sensor; gait sensor or other motion sensor (a characteristic motion may be sensed as a biometric input); DNA sequencer (for example receiving DNA as a biometric input); electromagnetic receiver (for example, receiving brainwaves, transmissions from body-implanted transmitters, or transponder system characterizing the transient response of a person to an electromagnetic pulse); or other biometric sensor.

The biometric sensor may also determine that the biometric input is being provided by a living person, for example by measuring an associated pulse or other physiological indication of life.

The signal 92 may be a signal activated when an authorized operator is identified. The signal may comprise an indicator lamp (such as a light-emitting diode) energized when an authorized operator is identified, a visual representation on a display, illumination of the biometric sensor, haptic signal, or other operator interface.

The position sensor 94, which is optional, may be a GPS sensor, cellphone-based triangulation device, or other device that provides an absolute position or a relative position relative to the base station.

If a biometric input corresponding to an authorized use is recognized, an authorization signal is transmitted using the transceiver and antenna. The biometric scanner may additionally receive signals from the base station. For example, the device may be activated after receiving an activation signal from the base station.

Figure 5:
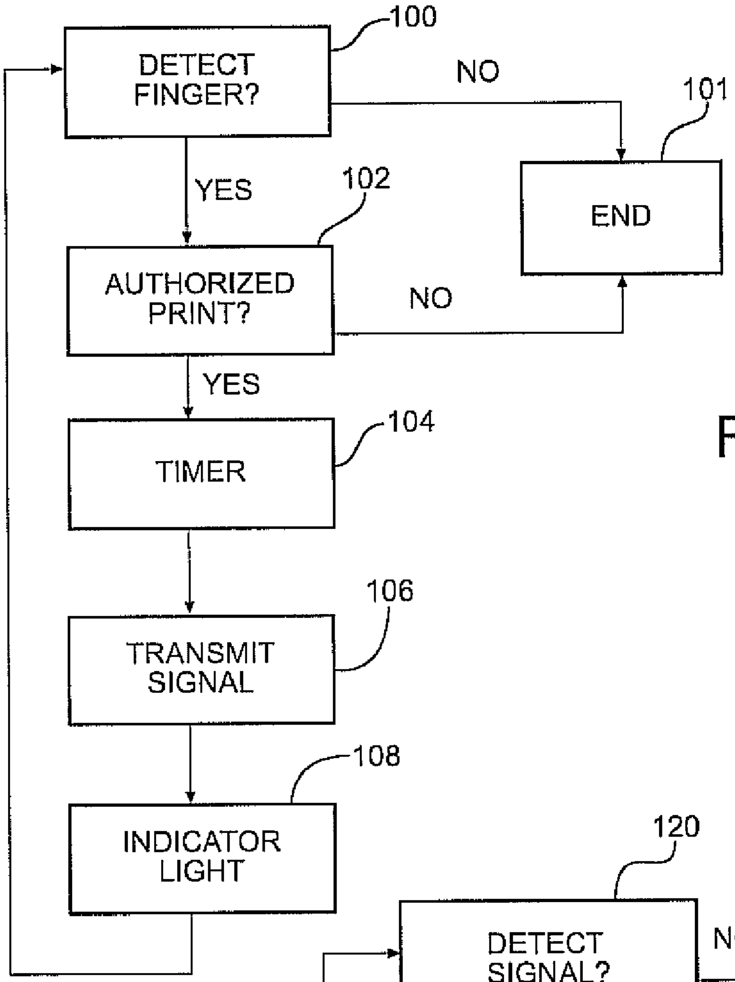
FIG. 5 is a flowchart showing a possible operation of a biometric scanner.

FIG. 5 shows a possible method of operation of a biometric scanner. The method of operation may be provided by a software program executed by a processor within the biometric scanner. In the example below, the biometric input is the placement of a portion of a finger on the fingerprint reader, a fingerprint reader then reading input fingerprint data from the finger.

Box 100 corresponds to detecting a finger on the fingerprint reader. If no finger is detected, the present process comes to an end. If a finger is detected, corresponding to the "yes" option on the figure, the fingerprint can then compared with authorized fingerprints.

Box 102 corresponds to determining if the fingerprint is that of an authorized operator. The input fingerprint may be compared, for example, to authorized fingerprints stored in a memory of the biometric scanner. Authorized fingerprints may also be stored at a remote location, such as in a computer database accessible by the scanner, or on the base station. Fingerprints may be reduced to numerical data to reduce data storage requirements, as is known in the art. Certain distances between typical fingerprint features may be measured, and converted into numerical parameters. If the fingerprint is not that of an authorized operator, corresponding to "no" on FIG. 5, the process comes to an end.

Box 104 corresponds to an optional timing delay. For example, if an authorized operator is detected, a reset pulse can be sent to a timer. If no reset pulse is received within a timing period, the timer signal terminates. If the timer has a two second timing period, the timer signal terminates two seconds after the finger is removed. This allows continuous operation of controlled equipment with momentary removal of the finger from the fingerprint reader. The timing delay is optional, and analogous circuitry may be provided in the base station Box 106 corresponds to transmitting an authorization signal to the base station. The authorization signal is transmitted as long as a fingerprint of an authorized operator is detected (subject to any timing modifications as described above in relation to box 104). The transmission is started if the authorized operator is detected for the first time, or maintained if the fingerprint was previously detected.

Box 108 is optional, and corresponds to providing operator feedback, such as an indicator light, to the operator showing if authorized status is detected.

If a fingerprint is detected, but cannot be identified as an authorized fingerprint, the operator may be prompted to clean the finger, reposition the finger, or otherwise improve the characteristics of the input fingerprint.

The process cycles until either no authorized fingerprint is detected, or the fingerprint detected is not recognized as that of an authorized operator, in which case the process comes to an end indicated by box 101. In practice the fingerprint reader will be sampled at intervals, such as every second, to determine if a finger is present. The fingerprint reader may send a signal starting this process if a finger is detected. A finger may be detected by the presence of an input fingerprint, or using, for example, a capacitive sensor responsive to touch pressure or electrostatic signals from the finger.

This method may be used with other types of biometric indicator, such as iris scans and the like. The indicator light 108 and timing delay 104 are optional and can be omitted. Similarly, the authorization step may in some examples be omitted. It may be sufficient that any person is present for transmission of a signal in box 104.

In other examples, the biometric scanner transmits biometric data to the base station, and the base station identifies the biometric data as being from an authorized operator. In this example, the authorization signal transmitted by the biometric scanner includes biometric data. The authorization signal is only transmitted while an authorized operator provides a biometric input, as if a non-authorized person provides the biometric input the transmitted signal cannot contain the necessary biometric data, and hence cannot act as an authorization signal.

Figure 6:
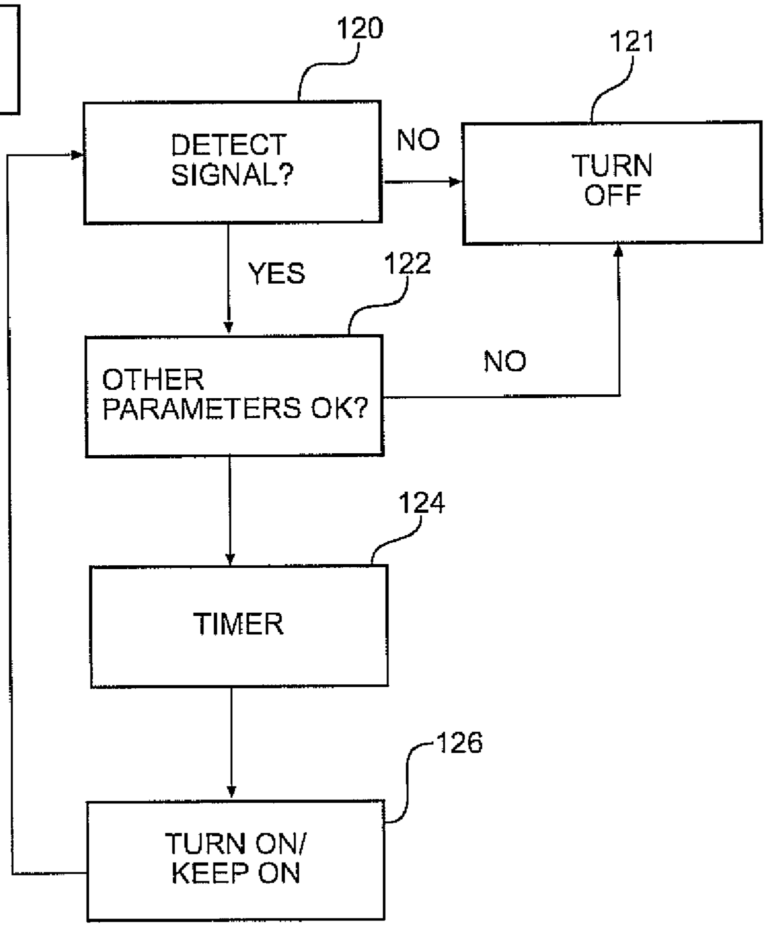
FIG. 6 is a flowchart showing a possible method of operation for a base station.

FIG. 6 shows a schematic of a possible method of operation of a base station.

Box 120 corresponds to detecting a signal from the biometric scanner. If no signal is detected, a controller in communication with the base station is turned off. The base station may operate directly as the equipment controller, and may be part of the equipment.

Box 122 is optional, and corresponds to checking that additional required parameters are within acceptable ranges when an authorization signal is detected. Additional parameters may include operating temperature, location of the operator, provision of additional authorization codes, provision of billing or payment information, fuel pressure (for refueling applications), time, other ambient conditions, or other parameters, such as distance to the source of the authorization signal or authorization signal strength, that may required to be within a certain range for the operation to proceed.

Box 124 corresponds to an optional timing delay, such as discussed above in relation to FIG. 5.

Box 126 corresponds to turning or keeping on an equipment controller, or the equipment itself. This may comprise provision of power to equipment, or an electrical signal to a deadman switch, or other switching system.

Box 121 is reached if no authorization signal is received, or if additional parameters are outside of acceptable limits, and corresponds to deactivating an equipment controller. This may correspond to shutting off the fuel supply to an airplane, turning off equipment, or otherwise stopping (or not starting) an operation that requires the presence of an authorized person.

The base station may provide an operation signal while the authorization signal is received from the biometric scanner. In other examples, the base station may provide a turn-on signal when the authorization signal is initially received, and a turn-off signal when the authorization signal is no longer received, or has not been received for a predetermined timing delay.

Examples of the present invention include improved aircraft fueling systems. In an illustrative example, an operator is provided with a biometric scanner including a wireless transmitter, which transmits an authorization signal to a base station when a biometric input is received. The base station receives electrical power from a vehicle battery, and if an authorization signal is received from the biometric scanner, the base station provides an electrical signal to the handle input of the deadman switch of a fuel handle. In this example, the base station includes a wireless receiver, possibly a wireless transceiver, and receives typically twelve volts from a vehicle battery as an input, and provides the fourteen volts output that is typically required to actuate a deadman switch, the electrical signal being directed to a handle input inside the refueling vehicle.

A biometric scanner can include a fingerprint reader in a portable device, the biometric scanner also including a dedicated power supply in the form of one or more batteries, and a wireless transmitter to transmit the authorization code. The biometric scanner can be in wireless communication with the base station. The base station can be located in the cabin of a refueling vehicle where it receives an input voltage from the vehicle battery. When an authorized person puts a finger on the fingerprint reader, the scanner authenticates the authorization of the operator, sends a authorization signal to the base station, and sends an output voltage of fourteen volts to the deadman handle input in the vehicle cabin. This example is particularly useful in an improved aircraft refueling system. Fuel flow can then be provided from the refueling vehicle to the aircraft. The fourteen volts output is provided as long as a finger of an authorized operator is on the fingerprint reader. As soon as the finger is removed from the scanner, the output voltage falls to zero, the deadman switch in the fueling handle no longer receives the required fourteen volts, and the fuel flow to the aircraft is shut off.

In examples of the present invention, the biometric scanner may have low power (less than one watt, to avoid sparking hazards), a working distance of less than 50 feet, may have multiple frequencies for multiple authorized operators (such as fuel vehicle operators) such as a frequency of 300 MHz with 256 identifications. The biometric scanner can be handheld, and may use a rechargeable or long-life battery as a dedicated power supply. Different wireless modulation patterns can also be used to differentiate different biometric scanners.

In fueling applications, the biometric scanner preferably does not generate any spark or similar combustion danger. The fueling process can have a shutoff time of less than approximately two seconds after the recognized biometric input terminates (for example, a finger removed from a fingerprint reader). The biometric scanner can provide a reasonably quick authentication of the operator, and can operate under both low and high temperatures typically found in an outdoor environment. The surface of the fingerprint reader may be heated to remove condensation or ice.

In examples of the present invention the biometric scanner may be the dimensions of a garage door opener, and may be similarly clipped to a sun visor of a vehicle. The biometric scanner provides a wireless or authorization signal when a biometric input is received from an authorized operator, for example when the finger of an authorized operator is on the fingerprint reader, and no longer provides the authorization signal after the finger is removed.

A suitable biometric scanner having a fingerprint reader may be adapted from commercially available designs, such as described in U.S. Patent Application Publication No. 2003/0032407 to Mages. The biometric scanner may have an internal antenna, external antenna protruding from its housing, or may connect to a longer antenna, for example in a vehicle.

Airport fueling regulations generally require that an aircraft fueling system has a deadman switch. Examples of the present invention go beyond the safety requirements of such regulations by allowing authentication of the operator.

Furthermore, in examples of the present invention, the biometric scanner is portable, enhancing operator mobility to improve process monitoring. In airplane fueling applications, the operator can move around, for example, to monitor the panel of fueling equipment, aircraft control panel during pressure fueling, and also can monitor fill ports during over-wing fueling. Hence, the operator need not be restricted to any fixed mechanical device.

In an example of the present invention, the operator is not required to stand depressing a mechanical switch as in certain conventional systems. Examples of the present invention provide all of the benefits of a deadman fueling system, while adding authentication of the operator identity, and allowing the operator mobility to investigate any potential safety hazards. The biometric input may not require any effort by the operator. For example, the operator may just rest a palm or finger onto a fingerprint reader. In other examples, the operator stands or sits where other biometric input can be collected, for example by an imaging sensor (for face recognition), or iris or retinal scanner.

Biometric scanners can be built in to vehicles or other equipment. For example, a steering wheel or other surface may include a fingerprint reader. Image sensors may be built into the vehicle cabin.

The system can be used with any kind of fuel control valve, such as a hydrant pit valve, at the tank outlet on a tank vehicle, on a separate valve of the tank vehicle, and on a hose nozzle of an over-wing servicing system.

The fingerprint authentication requirement also makes it difficult to defeat the deadman switch feature. Conventional mechanical controls or interlocks can be jammed open using pieces of metal or taped open or otherwise permanently opened without the requirement of an operator being present. This can cause a very serious safety hazard. Also, conventional deadman switches can be successfully operated by any person, whatever their relationship to the owner of the equipment. However, with the example improved apparatus described herein, a biometric scanner can accurately detect the presence of an authorized operator.

The biometric scanner may also have a pulse sensor, or similar, so that, for example, a fingerprint cannot be transferred to the surface of the fingerprint reader using an adhesive tape, silicone mold, dismembered finger, or similar method.

An example biometric scanner may be in the form of a wireless transmitting portable device having a fingerprint reader, the scanner possibly having the size of a key fob. For example, the wireless transmission of a biometric scanner may operate at approximately 2.4 GHz FHSS, 433.92 MHz, can be SAW resonator locked, use AM ASK transmission modulation, Keeloq™ code hopping technology, and/or have a 50 foot maximum range. All parameters may be variable according to the desired application and performance.

An example fingerprint reader which can be used in a biometric scanner is the TouchChip™ fingerprint reader (UPEK, Berkely, Calif.). Other fingerprint readers can be used, for example a solid-state fingerprint reader from Fujitsu Microelectronics America, Inc. (Sunnyvale, Calif.), such as the MBF320 or similar device. Other fingerprint readers are available can be adapted for use in examples of the present invention.

The biometric scanner may include one or more biometric sensors to determine if an operator is an authorized operator that is permitted to operate equipment. Biometric sensors may scan or otherwise analyze a fingerprint, toe print, exhalation components, heartbeat (including EKG signal), iris patterns, operator weight (for example standing on a sensor, the sensor detecting natural fluctuations of a standing person due to muscular contractions), electromagnetic field detection including brain wave detection, and the like.

Communication between the biometric scanner and the base station may take the form of radio frequency electromagnetic radiation, optical, IR, or other electromagnetic radiation. The communication may also be non-wireless, for example an electrical cable or fiber optic cable. The radio communication may be AM or FM modulated; for example using DSSS, FHSS, OFDM or other modulation schemes. Similarly other electromagnetic links may be modulated, for example an infrared link may be modulated.

Examples of the other applications include fueling of vehicles other than aircraft, recognition of an operator and automatic debit for payment, and the like. For example, an automobile fueling system may comprise a fuel pump that dispenses fuel on receipt of an identifying code provided by a biometric scanner. The person associated with the identifying code can then be automatically billed for the fuel purchased, in a similar manner to use of a bank debit card.

A biometric scanner, such as a scanner including a fingerprint reader, may be included into an improved gas pump handle, for example to only allow the gas pump to be used by an authorized person, or for automatic identification and billing of the person using the gas pump. The pump may be mechanically latched on as long as a finger is placed on a fingerprint reader. The fingerprint reader may be part of the pump handle, otherwise part of the pump assembly, or a portable unit.

In examples of the present invention, repetitive strain injuries caused by the need to physically hold down a lever of a deadman switch or other interlock can be avoided. In examples of the present invention a person only need contact a finger onto a fingerprint reader. The fingerprint reader may be adhered to a person's finger, or the biometric scanner may be mechanically attached to a person's hand, for example using a strap. In other examples, a person need only stand where their face can be recognized by a face recognition system.

Multiple biometric scanners may be used, for example a first scanner for an authorized operator, and a second scanner for a fuel purchaser, airplane pilot, or other vehicle operator. Security can be increased by requiring multiple authorized biometric inputs.

The biometric scanner may also include a position sensor, for example, which provides information on the relative proximity of the operator to the base station. This can be used in an improved safety interlock system, in which an operator has to be a certain distance away from a dangerous piece of equipment. Also, it can be used to ensure that a person is close enough to a piece of equipment, such as a fuel pump, so that the person may deal with any dangerous situations quickly.

The biometric scanner can be included as part of another portable electrical device, such as a cell phone, vehicle operation device such as an automatic unlocker, PDA (personal digital assistant), or other electronic device that may be conveniently carried by the operator.

Examples of the present invention also prevent an authorized operator from getting a non-authorized person, such as an unskilled colleague, to fill in for them while the authorized operator leaves the proximity of a dangerous process such as airplane refueling, or operation of equipment.

In other examples, it may only be necessary for a person (not any particular person) to be present. The biometric scanner may provide an authorization code so long as it receives a biometric input from a person, but need not verify that the received biometric input is from an authorized person. For example, an input fingerprint can be identified as being provided by a living human, without identification.

Stored biometric data used for identification may be set to expire after a certain time period, such as a week, year, rental period of the equipment, or other predetermined time period. The biometric scanner may include GPS circuitry or other position-determining circuitry, allowing the location of the authorized operator to be tracked. The scanner may transmit a location signal at intervals or continuously, or only when the authorization signal is transmitted.

Figure 7:
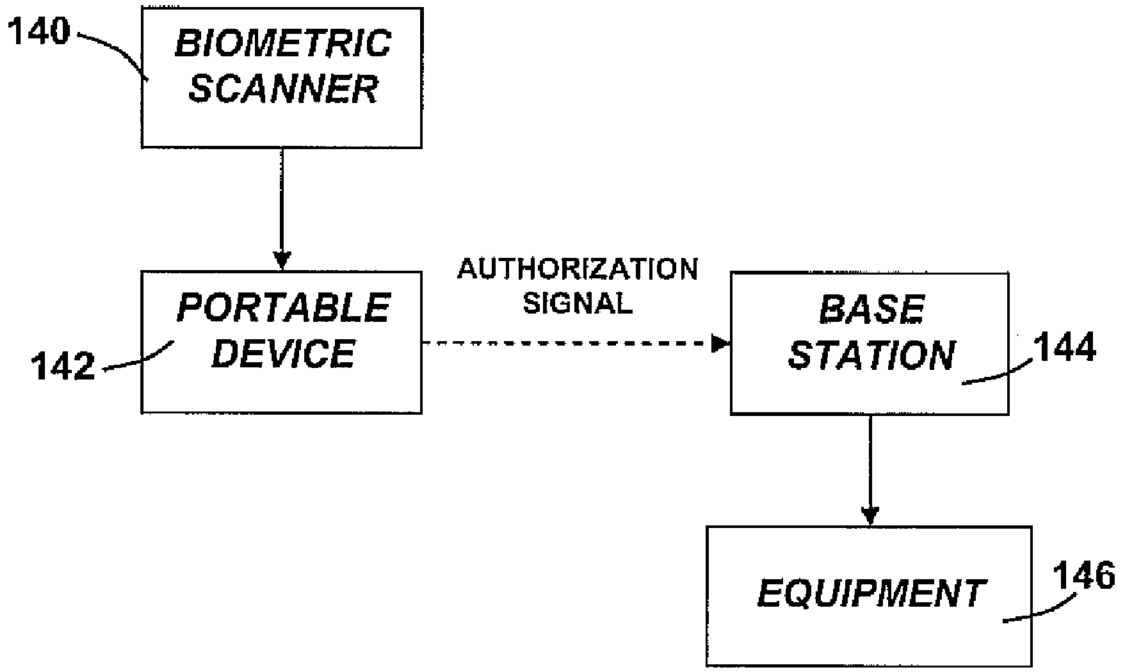
FIGS. 7-10 illustrate further example methods according to embodiments of the present invention.

FIG. 7 shows another embodiment of the present invention, comprising biometric scanner 140, portable device 142, base station 144, and equipment 146. In this configuration, an equipment operator provides, for example, a fingerprint to the biometric scanner. The biometric scanner transmits biometric data to the portable device. This may be carried by the equipment operator, and may receive the biometric data through a wireless or wired link. For example, a portable device may be connected to the biometric scanner using a cable or docking port, or another electronic connection. Alternatively, the portable device may include a wireless receiver to receive the biometric data wirelessly. The equipment operator then approaches the base station and an authorization signal is transmitted from the portable device to the base station as indicated by the jagged arrow.

In a high-security mode of operation, the base station receives biometric data within the authorization signal received from the portable device, and compares this biometric data with a database of data corresponding to authorized equipment operators. The authorized biometric data may be previously stored, for example within a database or other memory device, or alternatively may be received from the biometric scanner 140, for example, through a communications link. If the authorization signal from the portable device is found to include biometric data from an authorized operator, the base station communicates a signal to the equipment 146, allowing the equipment to operate or be operated by the authorized equipment operator.

The portable device 142 may further include a liveness sensor, a sensor that detects the proximity of a live person, such as a person holding the portable device. This feature can help prevent the portable device from being, for example, abandoned by an operator so defeating safety interlocks. The liveness sensor may include a pulse detector, or other sensor detecting the presence of a living person. The liveness sensor may be the same as a biometric sensor, for example a fingerprint reader that also detects a pulse.

On receiving an authorization signal, the base station activates a communications link between the base station and the portable device. The activation of the data link may require proximity of the portable device. For example, the portable device may need to be within a certain threshold radius of the base station, for example, four feet. The proximity detection allows improved safety of the device operation, by preventing an operator from being so far from the base station and/or equipment that they are not able to respond to emergencies. Proximity may be determined from signal strength, relative or absolute position data received from the portable device, other distance measuring techniques, such as ultrasound ranging or optical range finding, or any other distance measuring technique known in the art.

The portable device may also provide a device code within the authorization signal. The base station may only activate a data link with the portable device when the device code matches a list of known authorized device codes.

Continued operation of the equipment may require the portable device to remain within a certain distance of the base station. Continued operation may require substantially constant transmission of an authorization code, such as a device code or other data, such as biometric liveness indication and/or biometric signature matching. If the activation signal is lost the base station may switch off operation of the equipment. This switch off may be immediate, or may be within a certain time from the loss of reception of the authorization signal.

In some examples, once a data link is activated, the portable device can move away up to the maximum extent of its transmission power, as long as a device code and/or any other required data (such as a liveness indication) continues to be received. The maximum transmission power may be limited by regulations [such as FCC part 15], and may be 100 meters or more. After activation of a data link, an authorized equipment operator may program the base station with parameters, such as total fuel delivery [as in the case of aircraft fueling] or other equipment operation parameters. Other parameters may include total fuel, duration (or other operational parameter) of the equipment operation desired, identification of the authorized equipment operator, and the like.

Figure 8:
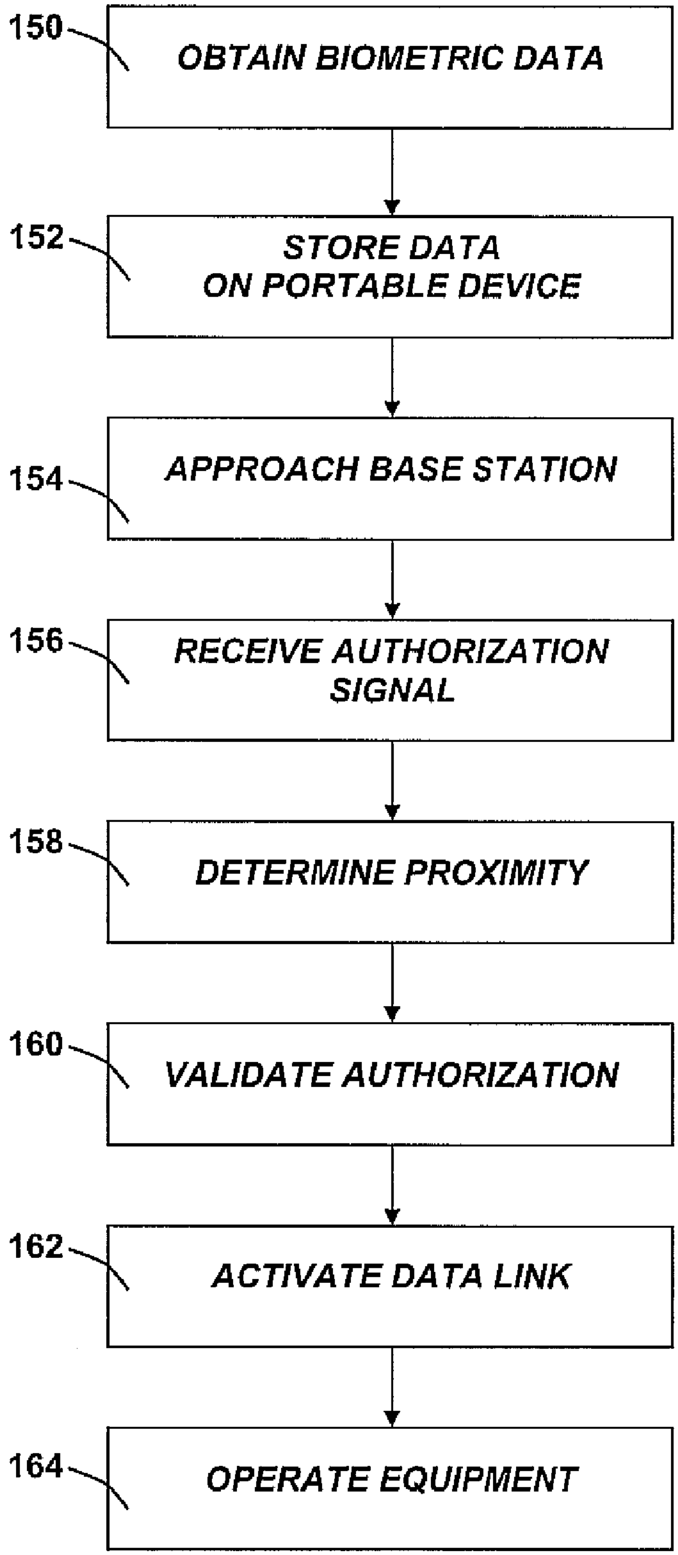

FIG. 8 illustrates an example process according to an embodiment of the present invention. Box 150 corresponds to obtaining biometric data from a person using a biometric scanner. The biometric scanner may be carried by the person, or in other examples, may be in a secure location. Box 152 corresponds to storing the biometric data on a portable device. For example, the portable device may receive the biometric data from a biometric scanner within a secure location. The portable device may include a biometric sensor, and allow comparison of detected biometric data with stored authorized data. Box 154 corresponds to a person approaching a base station carrying the portable device. Box 156 corresponds to the base station receiving an authorization signal from the portable device. The authorization signal may include a biometric signature and/or liveness indication. A biometric signature may be data indicating that the portable device has received an authorized biometric input. Box 158 corresponds to the base station determining the proximity of the portable device. The base station may only activate a data link with the portable device if the portable device is within a predetermined distance of the base station, as determined from authorization signal strength or other method.

Box 160 corresponds to the base station validating the authorization signal, for example by comparing biometric data encoded within the authorization signal with stored requirements. These stored requirements may include the biometric data, including a fingerprint that matches a database of authorized fingerprints. The portable device, or other device, may perform a biometric data match. In a lower security mode, the requirement may be that a liveness indication is received from the portable device, so that other biometric data is not required. Box 162 corresponds to the base station activating a data link with the portable device, over which additional data may be received. The additional data may include equipment operational parameters. Box 164 corresponds to the base station allowing operation of associated equipment, for example, through operation of a switch allowing fueling of an aircraft.

The base station may disable the operation of the equipment, for example due to loss of reception of the authorization signal, equipment operational parameters being met (for example, when performance of a requested operation is complete), or other factor.

Figure 9:
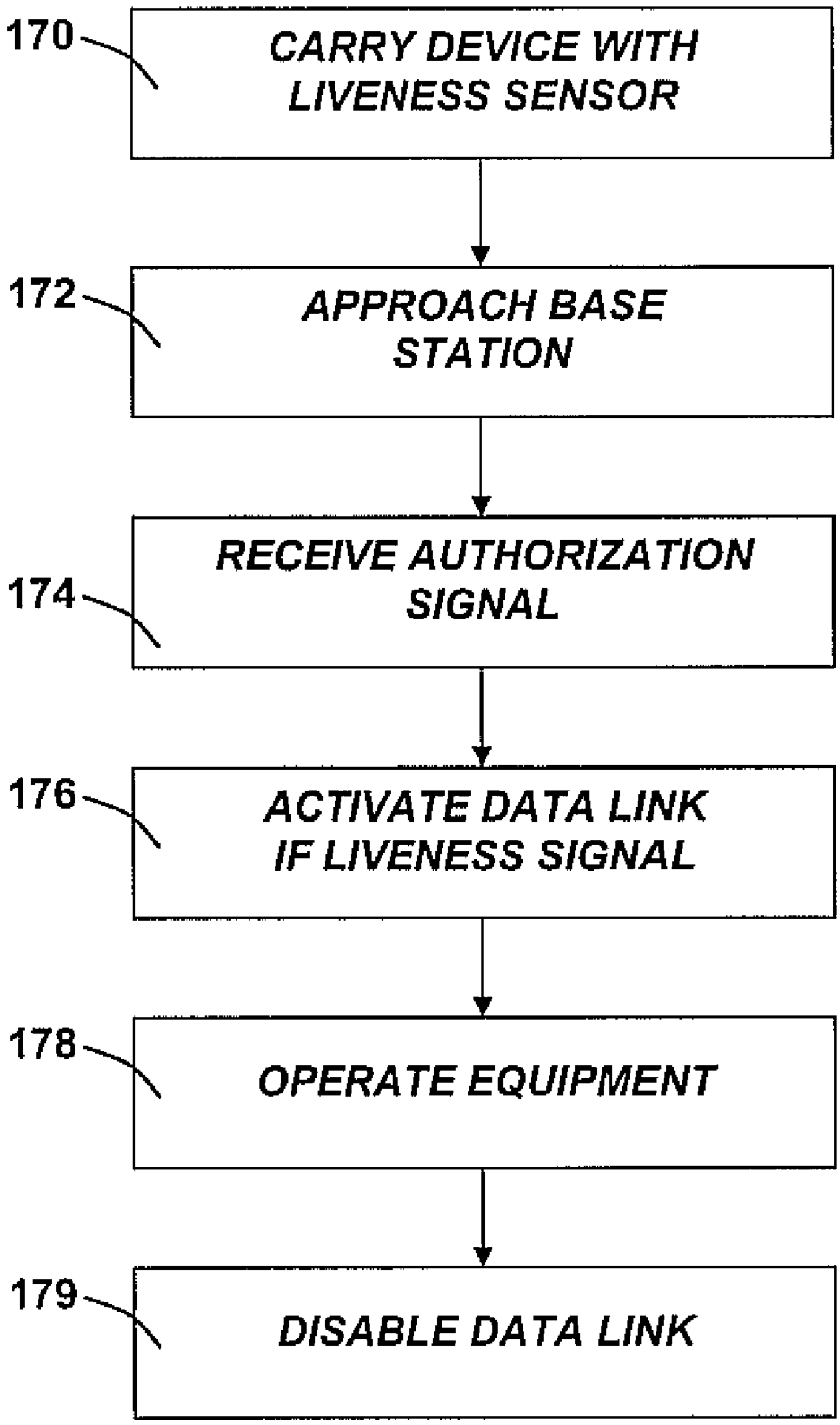

FIG. 9 illustrates an example process, which may be particularly useful in lower security applications. Box 170 corresponds to providing a portable device having a liveness sensor, providing a liveness indication showing that the device is in possession of a living person. Box 172 corresponds to a person approaching a base station carrying the portable device. The portable device transmits an authorization signal.

Box 174 corresponds to the base station receiving the authorization signal from the portable device. Box 176 corresponds to the base station activating a data link with the portable device if liveness data received within the authorization signal indicates that the portable device is associated for the living person. There may be other requirements for activating the data link, such as a recognized device code and/or proximity of the portable device to the base station. Box 178 corresponds to operation of the equipment, so long as the data link is activated. Box 179 corresponds to disablement of the data link when the authorization signal is no longer received. This may be followed immediately or after a predetermined delay by disablement of the corresponding equipment.

Figure 10:
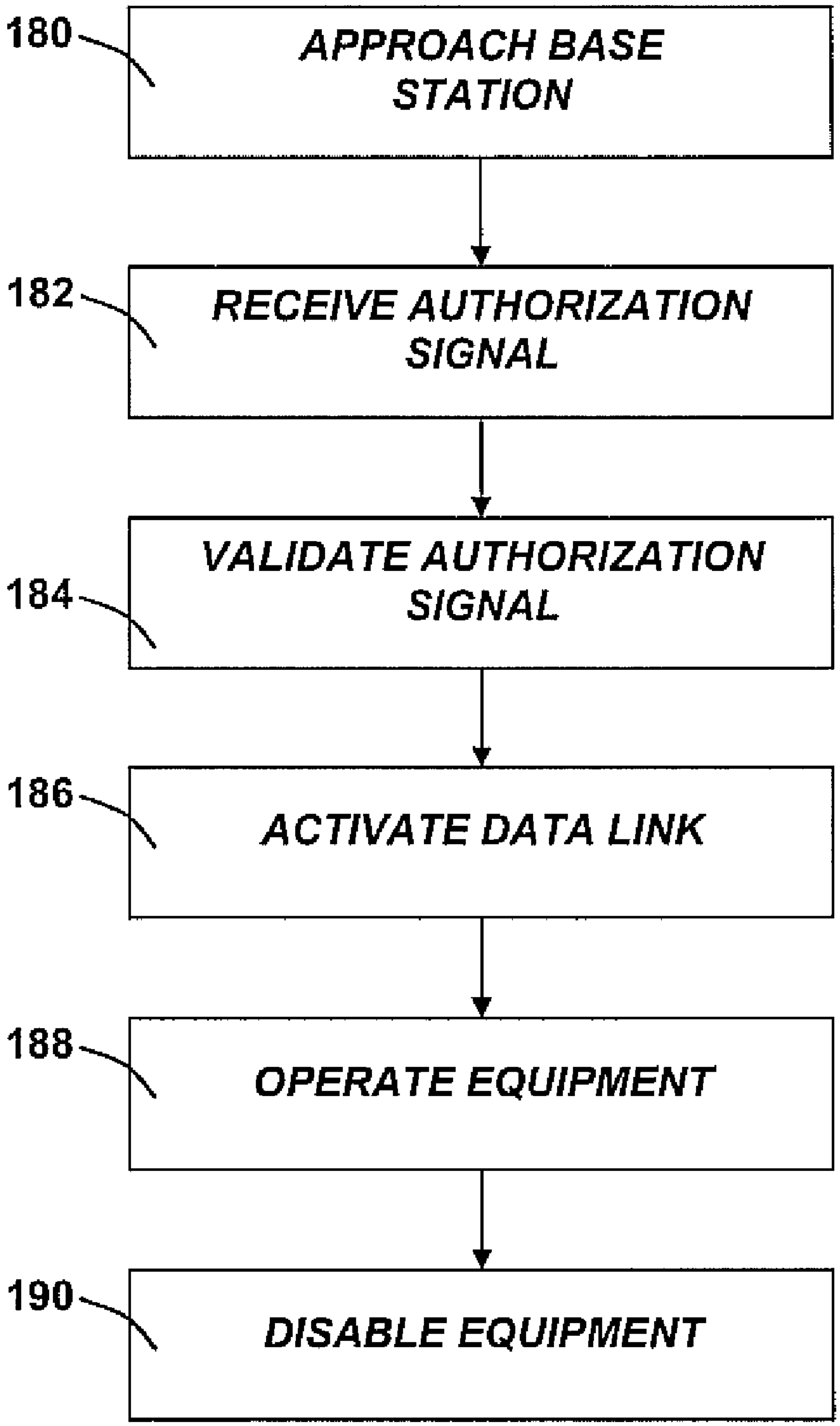

FIG. 10 illustrates a further example process. Box 180 corresponds to a person approaching the base station with a portable device. Box 182 corresponds to the portable device transmitting an authorization signal that is received by the base station. Box 184 corresponds to the base station validating the authorization signal (determining the authorization status of the person using the data contained within the authorization signal). Box 186 corresponds to activation of a data link between the base station and a portable device, with the optional transmission of additional data from the portable device. The additional data may include data entered by the person using a keypad or other interface provided by the portable device, such as an operation request. Box 188 corresponds to providing a switch signal to enable operation of associated equipment and box 190 corresponds to disabling the switch signal, preventing operation of the associated equipment, for example, after the authorization signal is no longer received.

Another example of an apparatus according to an embodiment of the present invention comprises a biometric scanner, which can be freestanding unit which may be placed in a secure location, such as a manager's office. The apparatus may further include a portable device and a base station. The portable device may comprise a biometric information receiver, processor, memory, RF generator, power control, transmitter, biometric sensor, user interface, and a display. The biometric information receiver in this example receives biometric data from the biometric scanner, for example, through a wireless or cabled link. The biometric data may be stored in memory and retrieved when required. Optionally, the portable device may include a biometric sensor, which may receive biometric data such as fingerprint data from a person, or comprise a liveness sensor, such as a pulse sensor.

The processor provides a transmit signal to a RF power controller, allowing radio frequency signals to be generated and transmitted to the base station. The power control may limit the range of the signal during normal use, for example, to conserve power and further, optionally, to only allow detection and activation of a data link with the base station when the portable device is sufficiently proximate to the base station. An optional user interface allows input of equipment operational parameters, for example, in the case of fueling applications, this may include fuel delivery quantity.

The base station, in this example, includes a receiver, a receiver signal decoder, processor, memory, and communication unit. The receiver receives the authorization signal from the portable device. The decoder extracts information within the authorization signal, which may include biometric data, liveness data, device code corresponding to the portable device, any operational parameters required, and any other data that may be useful. This data is provided to the processor.

According to security requirements, the processor compares any or all of the data within the authorization signal with stored data within the memory. Hence, a base station may have a plurality of security modes. For example, for enhanced security operation, fingerprint data within the authorization signal may be compared with stored authorized operator fingerprint data within the memory. Alternatively, the biometric signature may comprise data from the portable device that indicates an acceptable biometric input has been received. In lower security applications, only a liveness indication and/or proximity and/or device code may be compared, and additional biometric data not required. The same portable device may be used with a plurality of base stations.

The base station controls the operation of associated equipment. The associated equipment may be a deadman switch for a fueling system, or any other equipment. A base station may communicate with equipment using a communications unit, which may be a further wireless transmitter, for example a deadman switch having an associated wireless receiver. Alternatively, the communications unit may comprise a cable connection between the base station and a deadman switch (or other equipment or equipment controller). The portable device may be a biometric sensor, such as described above.

An optional display within or associated with the portable device may be used to identify a battery life signal strength and other data link parameters. If the user removes their finger from the biometric sensor of the portable device, the data link, once activated, will remain active during a predetermined time. For example, a countdown timer may be used. The countdown timer may be used to define, for example, for a predetermined period, such as five minutes. In some applications, the base station will enable operation of a valve, as in the case of aircraft fueling. If a person reengages a finger with the portable device, providing either biometric signature matching or a liveness indication, the switch may be reengaged.

Applications

Applications of the present invention include improved methods and apparatus for fueling applications (including aviation fueling), operation of dangerous equipment (such as sandblasters, construction equipment, and the like), hazardous material handling, and security applications (such as security checkpoints, access to restricted areas, and the like). The controlled equipment may include fuel dispensers, chemical processing and/or handling equipment, radioactive material handling, vehicles (for example, operational control on land vehicles, ships, airplanes, and the like), access control devices (such as barriers, locks, building, or site entrances), automatic teller machines (ATMs), and the like.

For example, a portable device according to an example of the present invention can be used as a safety interlock, whereby operation of equipment is only allowed while an authorization signal is received from the portable device. The authorization signal may include a biometric signature (for example, data derived from a biometric sensor such as a fingerprint reader, or data indicating that a biometric input has been accepted). The portable device may include a biometric sensor, so that equipment operation is allowed only if an acceptable biometric input is received by the biometric sensor, such as a finger placed on a fingerprint reader. In some examples, a maintained biometric input is needed to allow continued operation of the equipment, or in other examples this may not be needed.

Initial Proximity and Active Proximity

In some examples of the present invention, a base station only allows operation of the equipment if an authorization code is received from a source having an initial proximity to the base station.

In some examples, a person carries a portable device, such as a hand-held device, which generates a short-range signal. The base station receives the short range signal, and may determine if this is acceptable as an authorization signal. The base station can be configured to reject high power signals, which may be useful to prevent jamming. A short range electromagnetic wireless transmission may be used. In some examples, a portable device may use another communication methods, such as IR beam, ultrasound, capacitive coupling, and the like, may require electrical contact with a base station, or other communication method used that can be restricted to short range operation. Short range operation may require the portable device to be within one or two meters of the base station. In other examples, a person may activate a data link between a portable device and a base station by interacting with the base station.

Equipment operation may require an initial reception of a signal originating from a proximate location, for example within a predetermined distance, or being detected at a power below a predetermined threshold. The signal may be an authorization signal from a portable device. After the initial reception, equipment operation may start, possibly after communication of other data such as operating parameters, authorization data, and the like. Continued operation of the equipment may or may not require proximity to be maintained. In some examples, after initial reception, the signal strength from the portable device can be increased so as to allow, for example, a person with the portable device to move further away from the equipment. However, continued reception of an authorization signal including a liveness indication may be required for continued equipment operation. If the signal is lost, a timer may start, and the equipment turned off within a predetermined time (such as 10 seconds), unless an authorization signal is detected again.

Hence, there may be two proximities required: an initial proximity for initiation using a low power signal, and an active proximity for continued operation after successful initiation, the initial proximity corresponding to a need to be closer to the equipment than for the active proximity.

The authorization signal may correspondingly have two portions, a lower power initial portion to initiate operation, and a higher power active portion to continue operation. A biometric signature may be transmitted during the initial portion, and a liveness indication transmitted during the active portion. In some examples, as long as the active portion is maintained, the biometric signature need not be transmitted again as long as a liveness indication is present.

Portable Device

A portable device may include a biometric sensor, a transmitter (or transceiver) for transmitting an authorization signal, and an electronic circuit operable to obtain a biometric signature from a biometric input, and to transmit an authorization signal (automatically or on demand). In some cases, the power transmission of the authorization signal may be increased after an initial lower power signal is accepted by the equipment control system. The base station may transmit a recognition signal on its acceptance of an authorization signal. In some cases, two-way data link may be established between the portable device and base station, with a higher power authorization signal being transmitted as long as the two-way data link is maintained. If the two-way data link is broken, for example due to the portable device being too far away, or other factor, the authorization signal may return to a lower power setting.

Multiple Security Modes

Methods and apparatus according to embodiments of the present invention allow different levels of security to be implemented. The base station may be configured to require an authorization signal having a degree of security, and the required degree of security can be changed according to operational conditions. For example, the degree of security can be modified if a threat is perceived (or reduced), or if regulations change, or as desired.

An example portable device includes a biometric sensor, and this along with an associated electronic circuit can be used to add a biometric signature to a transmitted authorization signal. A liveness indication may also be included. Further, authorization signal may include a device code and/or a security code. A security code may be entered using a keypad if one is present.

In a higher security mode, the equipment controller may require a biometric signature to be present in an authorization signal. A liveness indication may also be required. In a lower security mode, a liveness indication may be required, but a biometric signature may not be required. An authorization signal may also include an authorization code (such as a personal identification number), and/or a device code, without a biometric signature, in lower security applications.

Patents, patent applications, or publications mentioned in this specification are incorporated herein by reference to the same extent as if each individual document was specifically and individually indicated to be incorporated by reference. In particular, the following documents are incorporated by reference: U.S. Prov. Pat. Apps. Ser. Nos. 60/892,313 and 60/892,312, and US Pub. Pat. App. 2007/0055888 to Miller et al.

The invention is not restricted to the illustrative examples described above. Examples are not intended as limitations on the scope of the invention. Methods, apparatus, compositions, and the like described herein are exemplary and not intended as limitations on the scope of the invention. Changes therein and other uses will occur to those skilled in the art. The scope of the invention is defined by the scope of the claims.

Having described our invention, we claim:

1. An apparatus for allowing operation of equipment, the apparatus comprising:

a portable device, operable to transmit an authorization signal; and a base station, operable to receive the authorization signal, the base station allowing operation of the equipment as long as the authorization signal is received from the portable device, the portable device being operable to transmit the authorization signal at a first power until the authorization signal is received by the base station, the base station establishing a data link between the base station and the portable device when the authorization signal is received by the base station, the portable device then transmitting the authorization signal at a second power after the data link is established, the second power being at least fifty per cent greater than the first power.

2. The apparatus of claim 1, the base station allowing operation of the equipment only if the portable device is proximate to the base station when the authorization signal is received, the base station allowing continued operation of the equipment as long as the authorization signal is received.

3. The apparatus of claim 2, the base station allowing operation of the equipment only if the portable device is within approximately 2 meters of the base station when the authorization signal is first received, the base station allowing continued operation of the equipment until the portable device is outside a transmission range of the higher power authorization signal, the transmission range being at least approximately 10 meters.

4. The apparatus of claim 1, the authorization signal being an electromagnetic wireless signal.

5. The apparatus of claim 1, wherein the authorization signal includes a biometric signature.

6. The apparatus of claim 1, wherein the authorization signal includes a liveness indication.

7. The apparatus of claim 6, wherein the equipment is a fueling system, actuation of a switch within the base station allowing operation of the fueling system, the switch actuation ending within a predetermined time of the base station no longer receiving the authorization signal.

8. The apparatus of claim 1, the apparatus having a plurality of operational modes including:

a first operational mode in which the authorization signal includes a biometric signature, a second operational mode in which the authorization signal does not require the biometric signature.

9. An apparatus for allowing operation of equipment, the apparatus comprising:

a base station, operable to receive an authorization signal, the base station allowing operation of the equipment as long as an authorization signal is received, the base station allowing initial operation of the equipment only if the authorization signal originates within a predetermined distance from the base station, the base station allowing continued operation of the equipment as long as the authorization signal is received, even if the authorization signal originates outside the predetermined distance from the base station.

10. The apparatus of claim 9, wherein the first distance is less than approximately 10 meters.

11. The apparatus of claim 9, wherein the first distance is less than approximately 1 meter.

12. The apparatus of claim 9, the apparatus having a higher security mode and a lower security mode, the base station requiring the authorization signal to include a biometric signature in the higher security mode, the base station not requiring the authorization signal to include a biometric signature in the lower security mode.

13. The apparatus of claim 9, the apparatus further including a portable device including a biometric sensor, the portable device being the source of the authorization signal.

14. The apparatus of claim 13, the authorization signal activating a data link with the portable device when an authorization signal is received within the first distance of the base station, the second distance being the range of the data link.

15. The apparatus of claim 13, the portable device including a fingerprint reader, the biometric signature being derived from the fingerprint.

16. The apparatus of claim 13, the portable device including a liveness sensor, the authorization signal including a liveness indication.

17. The apparatus of claim 13, wherein the apparatus includes a switch, the switch being actuated only if the base station is receiving the authorization signal.

18. The apparatus of claim 17, wherein the base station is located in a fuel truck, and the equipment is a fueling system, actuation of the switch allowing operation of the fueling system.

19. An apparatus for providing an authorization signal, the authorization signal allowing operation of equipment on receipt of the authorization signal, the apparatus being a portable device including a biometric sensor, a transmitter, and a receiver, the apparatus being operable to transmit the authorization signal using the transmitter on receiving a biometric input using the biometric sensor, the apparatus being further operable to increase transmission power of the authorization signal after receipt of the authorization signal.

20. The apparatus of claim 19, the authorization signal including a liveness indication.

21. The apparatus of claim 19, the biometric sensor being a fingerprint reader, the biometric signature being derived from the fingerprint reader.

22. The apparatus of claim 19, wherein the portable device further includes a memory, the portable device identifying the biometric input as being from the authorized operator by comparing the biometric input with stored biometric data in the memory.

23. A process for allowing operation of equipment by an authorized operator, the process comprising:

receiving an authorization signal from a portable device;

allowing operation of the equipment only if the authorization signal has an initial signal strength less than a predetermined threshold; and stopping operation of the equipment after reception of the authorization signal is ended.

24. The process of claim 23, wherein the equipment is a fueling system.

25. The process of claim 23, further including:

selecting an operating security mode from a plurality of operating security modes including:

a first mode requiring the authorization signal to include a biometric signature, and a second mode requiring the authorization signal to include a liveness indication but not a biometric signature.

26. The process of claim 23, wherein operation of the equipment is stopped within ten seconds after reception of the authorization signal is ended.

* * * * *

UNITED STATES PATENT AND TRADEMARK OFFICE

CERTIFICATE OF CORRECTION

PATENT NO. : 7,946,483 B2
APPLICATION NO. : 12/041194
DATED : May 24, 2011
INVENTOR(S) : Brian Scott Miller et al.

It is certified that error appears in the above-identified patent and that said Letters Patent is hereby corrected as shown below:

Title page, Item (57) Abstract, line 8, "shoortly" should read --shortly--.

Signed and Sealed this
Thirty-first Day of January, 2012

David J. Kappos
*Director of the United States Patent and Trademark Office*